UNITED STATES PATENT OFFICE.

VIGGO DREWSEN, OF BROOKLYN, NEW YORK, ASSIGNOR TO WEST VIRGINIA PULP & PAPER COMPANY, OF NEW YORK, N. Y., A CORPORATION OF DELAWARE.

PROCESS FOR THE TREATMENT OF WASTE LIQUORS FROM SODA PULP PROCESSES, &c.

1,298,479.     Specification of Letters Patent.     Patented Mar. 25, 1919.

No Drawing.     Application filed July 23, 1918. Serial No. 246,830.

*To all whom it may concern:*

Be it known that I, VIGGO DREWSEN, a citizen of the United States and resident of the borough of Brooklyn, county of Kings, city and State of New York, have made a certain new and useful Invention Relating to Processes for the Treatment of Waste Liquors from Soda Pulp Processes, &c., of which the following is a specification.

This application is a continuation in part of my co-pending application Serial No. 811,676, filed January 12, 1914, and contains subject-matter taken therefrom.

This invention relates especially to the treatment of soda waste liquor, known as black liquor, and which is formed when paper pulp is manufactured from deciduous or other woods by the caustic soda process, this black liquor being preferably first concentrated as by evaporation until it contains only about fifty per cent. or so of water. Additional caustic alkali such as caustic soda may also be advantageously incorporated with the concentrated waste liquor in some cases before the material is subjected to dry distillation, and if desired, such additional caustic soda to the extent of about fifteen to thirty per cent. or so of the weight of the organic matter present may be incorporated with the concentrated waste liquor; the mixture being preferably heated and boiled, at a temperature of about 125° centigrade for an hour or more, until more of the water is boiled off and the desired incorporation and conversion action takes place. The concentrated soda waste liquor, with or without the incorporation of such additional caustic alkali therewith, may be causticized by thoroughly incorporating therewith powdered quicklime to the extent of thirty-five to sixty per cent. or so of the weight of the concentrated waste soda liquor, with which it combines in connection with the slaking of the quicklime by the water present, part of which is thereby driven off. Causticized calcareous ligneous acetate material may thus be formed which is in permanently solid condition so as not to undesirably melt or foam under dry distilling conditions, and it may be in the form of a substantially dry powder or granulated material when about fifty per cent. of powdered quicklime is used. The causticized material may be subjected to distillation at high temperatures preferably with superheated steam and during the distillation is preferably gradually and uniformly heated while being agitated, which results in the recovery of large proportions of acetone, methyl alcohol and other valuable materials.

By this process large quantities of acetone and methyl alcohol together with some allied ketone volatile solvent material and still further quantities of oily distillates can be conveniently recovered from the waste liquor produced in the digestion of deciduous or other woods in the manufacture of wood pulp, etc., by the caustic soda process. Suitable black liquors or soda waste liquors are produced when poplar wood is used in the digesters or other deciduous woods, such as mixed deciduous woods, including poplar, sycamore and gum woods. The spent soda liquors from the digesters may be concentrated by evaporation in multiple effect evaporators until considerably concentrated as when the concentration is carried far enough to reduce the proportion of water in the material to about fifty per cent. or so. The usual black liquors preferably when concentrated to such thick syrupy consistency may be subjected to a supplemental converting process with additional caustic alkali, such as caustic soda to the extent of about fifteen to thirty per cent. of the weight of the organic matter present in the concentrated solution, twenty per cent. of caustic soda giving goods results, the mixture to secure thorough incorporation being preferably heated or boiled under suitable pressure or even in some cases under a partial vacuum for a considerable time, the treatment extending about an hour or two in a digester or open evaporator in which the mixture is boiled at a temperature of about 120 to 140 degrees centigrade, but preferably at about 125 degrees centigrade. This heat conversion treatment may also effect elimination of still further proportions of water, when as is desirable the steam is allowed to escape.

The concentrated soda waste liquor with or without the incorporation of such additional caustic alkali therewith may advantageously be causticized by the incorporation of powdered quicklime to the extent of thirty-five to sixty per cent. or so of the weight of the concentrated soda waste liquor which may contain about fifty per cent. of water. On thoroughly incorporating therewith fifty per cent. for instance of powdered quicklime, which is considerably more than the amount of organic material present, the quicklime is slaked and seems to combine with the organic material, considerable water being driven off by the heat of slaking. The causticized material which may thus be formed, containing considerable acetate compounds, is permanently solid under dry distilling conditions so as not to undesirably melt or foam in the still and thus give trouble and prevent the uniform heating which is desirable in this connection. It is not, of course, necessary in all cases to incorporate as much as fifty per cent. of powdered quicklime with concentrated soda waste liquor containing about fifty per cent. of water, since the incorporation of thirty-five or forty per cent. or so of quicklime therewith gives a causticized material which can be largely or completely dehydrated in various ways and then remains permanently solid under destructive distillation. Furthermore, in some cases where the concentrated soda waste liquor originally contains less water the percentage of incorporated quicklime may be correspondingly still further reduced to some extent, although it is desirable to use, preferably substantially uniformly incorporated throughout the mass, not only ample quicklime or other alkali material to combine with the organic material before and during destructive distillation, but also to be capable of rendering the causticized material permanently solid under distilling conditions. The combined soda in this causticized calcareous ligneous acetate material may be largely or practically completely converted into the caustic soda form where fifty per cent. or so of quicklime is used and this has the additional advantage that when the carbonized distillation residue is leached the dissolved soda is substantially in the caustic condition desirable for wood pulp cooking liquors so that further causticizing is unnecessary. Where fifty per cent. or so of powdered quicklime is used the continued agitation or stirring of the mixture may eliminate sufficient water so that the causticized material is in finely granulated or substantially dry powdered form.

The granular or finely divided causticized material thus obtained may then be distilled in any suitable retort with superheated steam, for example, at 300 to 500 degrees centigrade or so and large quantities of acetone or methyl alcohol are thus secured, together with considerable additional amounts of black oily material. It is in some cases desirable that precautions be taken to minimize or prevent destructive or other undesirable oxidizing action on such calcareous ligneous acetate material prior to and during the distilling thereof, and therefore to minimize its contact with air or other oxidizing medium, especially when the acetate material is substantially dry and hot. It is thus desirable, where the causticized ligneous acetate material contains no more than a few per cent. or so of moisture, to distil the same promptly after it is formed, or to store it in a neutral or substantially non-oxidizing atmosphere or at least out of undesirable contact with oxygen or other oxidizing material which might materially decrease the yield of acetone and the like. When treating black liquor produced when poplar wood is digested in the usual soda process of making wood pulp, yields of acetone and methyl alcohol have been secured as high as five to ten per cent. or more of the weight of the organic matter in the waste liquor, together with small quantities of allied volatile solvents, such as the higher ketone solvents, etc. There may also be secured in this distillation some three to ten per cent. of heavier oily solvent bodies which as a whole are lighter than water and which contain considerable water immiscible material. There is, of course, a large proportion of other more volatile material of a gaseous nature given off during the distillation and which is sufficiently inflammable so as to be used for retort heating and other heating purposes, if desired.

The products of the distillation of the converted causticized ligneous acetate material may be separated or fractionated in any suitable way so as to separate the more valuable volatile solvent materials from the other materials as by repeated distillation in a column still, for example, or in other ways. The distillation residue in the retort may, of course, be submitted to still higher heat and may be finally burned in the presence of air and the caustic or other valuable mineral matter may be separated as by leaching with hot water, for example, which dissolves the soda present and permits it to be recovered largely in the form of caustic soda with some little carbonate of soda while the remaining insoluble material may, if desired, be burned in a suitable kiln to recover the lime.

This invention has been described in connection with a number of illustrative apparatus, materials, proportions, arrangements, temperatures, pressures, times and orders of steps, to the details of which disclosure the invention is not of course to be limited, since what is claimed as new and what is desired to be secured by Letters Patent is set forth in the appended claims:

1. The process of treating the waste liquor produced in the manufacture of wood pulp from deciduous woods by the soda pulp process, which consists in concentrating the waste liquor by evaporation until the proportion of water in the concentrated material is only about fifty per cent. in incorporating with the concentrated waste liquor caustic soda to the extent of about twenty per cent. of the organic matter present and boiling the mixture under pressure at about 125 degrees centigrade for at least an hour until conversion takes place and the mixture is further concentrated by evaporation, in reducing the converted concentrated material to a substantially dry powdered causticized material by incorporating therewith powdered quicklime to an amount at least about equal in weight to the organic matter present, in subjecting the substantially dry causticized material to distillation with superheated steam at about 300 to 500 degrees centigrade to recover acetone, methyl alcohol and additional allied volatile solvent material to the extent of five to ten per cent. or more of the organic matter in the original waste liquor.

2. The process of treating the waste liquor produced in the manufacture of wood pulp by the soda pulp process, which consists in concentrating the waste liquor, in incorporating with the concentrated waste liquor caustic soda to the extent of about twenty per cent. of the organic matter present and boiling the mixture, in reducing such concentrated material to a substantially dry causticized material by incorporating therewith quicklime to an amount at least about equal in weight to the organic matter present, in subjecting the substantially dry causticized material to distillation with steam to recover acetone and additional allied volatile solvent material and additional heavier oil solvent bodies.

3. The process of treating the waste liquor produced in the manufacture of wood pulp by the soda pulp process, which consists in concentrating the waste liquor, in incorporating with the concentrated waste liquor caustic soda, in reducing the converted concentrated material to permanently solid causticized material by intimately incorporating quicklime therewith, and in subjecting the causticized material to dry distillation to recover volatile solvent material.

4. The process of treating the waste liquor produced in the manufacture of wood pulp by the soda pulp process, which consists in concentrating the waste liquor by evaporation until the proportion of water in the concentrated material is only about fifty per cent., in incorporating additional caustic alkali therewith and boiling the mixture, in incorporating with the concentrated material quicklime to an amount at least about equal in weight to the organic material present to convert it into a substantially dry causticized acetate material which is permanently solid under dry distilling conditions, and in slowly and uniformly heating and distilling the substantially dry causticized material with superheated steam at about 300 to 500 degrees centigrade to recover acetone, methyl alcohol and allied volatile solvent material to the extent of five to ten per cent. or more of the organic material present in the waste liquor.

5. The process of treating the waste liquor produced in the manufacture of wood pulp by the caustic soda process, which consists in incorporating with the concentrated waste liquor caustic alkali to the extent of at least about fifteen per cent. of the organic matter present and boiling the mixture, in incorporating with the converted concentrated material alkali material to convert it into a causticized material which is permanently solid so as not to objectionably melt or foam under dry distilling conditions and in subjecting the causticized material to dry distillation with superheated steam to recover five to ten per cent. or more of acetone and additional allied volatile solvent material.

6. The process of treating waste liquor produced in the manufacture of wood pulp by the soda pulp process, which consists in concentrating the waste liquor by evaporation until the proportion of water in the concentrated material is below fifty per cent. and incorporating therewith caustic alkali to the extent of at least about twenty per cent. of the organic matter present, in reducing the converted concentrated material to a substantially dry causticized condition by incorporating therewith quicklime to an amount at least about equal in weight to the organic matter present, and in subjecting the substantially dry causticized material to distillation to recover five to ten per cent. or more of acetone, methyl alcohol and additional allied volatile solvent material and additional heavier oil solvent bodies.

7. The process of treating the waste liquor produced in the manufacture of wood pulp by the soda pulp process, which consists in boiling the same, in incorporating therewith alkali material to convert it into a causticized material which is permanently solid so as not to objectionably melt or foam under dry distilling conditions, and in subjecting the causticized material to dry distillation to recover five to ten per cent. or more of acetone and additional allied volatile solvent material.

8. The process of treating the waste liquor produced in the manufacture of wood pulp by the soda pulp process, which consists in concentrating the waste liquor by evaporation and incorporating additional caustic alkali therewith, in thoroughly incorporating with the concentrated material quicklime to convert it into a causticized acetate material which is permanently solid under dry distilling conditions, and in slowly and uniformly heating and distilling the causticized material with steam at about 300 to 500 degrees centigrade to recover five to ten per cent. or more of acetone, methyl alcohol and additional allied volatile solvent material.

9. The process of treating the waste liquor produced in the manufacture of wood pulp by the soda pulp process, which consists in concentrating the waste liquor by evaporating and in incorporating with the concentrated material quicklime to convert it into a causticized acetate material which is permanently solid under dry distillation conditions, and in distilling the causticized material to recover acetone, methyl alcohol and additional allied volatile solvent material.

10. The process of treating the waste soda liquor produced by the caustic soda pulp process, which consists in concentrating the waste liquor by evaporation until the proportion of water in the concentrated material is only about fifty per cent., in reducing the concentrated material to substantially dry causticized material by thorougly incorporating therewith quicklime to an amount between about thirty-five and sixty per cent. by weight of said concentrated material, and in subjecting the substantially dry causticized material to distillation with steam at about 300 to 500 degrees centigrade to recover five to ten per cent. or more of acetone and additional allied volatile solvent material.

11. The process of treating the waste soda liquor produced by the caustic soda pulp process, which consists in concentrating the waste liquor by evaporation until the proportion of water in the concentrated material is no more than about fifty per cent., in reducing the concentrated material to substantially dry causticized material by incorporating therewith quicklime to an amount over thirty-five per cent. by weight of said concentrated material, and in subjecting the substantially dry causticized material to dry distillation and minimizing undesirable oxidizing action on said causticized material until it is distilled to recover five to ten per cent. or more of acetone and additional allied volatile solvent material.

12. The process of treating the waste liquor produced in the treatment of fibrous vegetable material by the soda process, which consists in concentrating the waste liquor and incorporating therewith considerable additional caustic soda, in reducing the concentrated material to a causticized material which is substantially permanently solid under dry distilling conditions by incorporating therewith powdered quicklime to the extent of more than sixty per cent. by weight of the solids in said concentrated material and in gradually heating and dry distilling the causticized material to recover therefrom acetone and additional allied volatile solvent material.

13. The process of treating the waste liquor produced in the treatment of fibrous vegetable material by the caustic soda process which consists in concentrating the waste liquor, in reducing the concentrated material to a causticized material which is substantially permanently solid under dry distilling conditions by incorporating therewith quicklime to the extent of more than fifty per cent. by weight of the solids in said concentrated material and in gradually heating and dry distilling the causticized material and minimizing undesirable oxidizing action on said causticized material until it is distilled to recover therefrom acetone and additional allied volatile solvent material.

14. The process of treating the waste liquor produced in the treatment of fibrous vegetable material by the caustic alkali process which consists in concentrating the waste liquor, in reducing the concentrated material to a causticized material which is substantially permanently solid under dry distilling conditions by incorporating therewith quicklime and in dry distilling the causticized material to recover therefrom acetone and additional allied volatile solvent material.

15. The process of treating the waste liquor produced in the manufacture of wood pulp by the caustic soda pulp process, which consists in concentrating the waste liquor, in reducing the concentrated material to a substantially dry causticized ligneous acetate material by thoroughly incorporating powdered quicklime therewith, in substantially preventing undesirable oxidizing action on said causticized ligneous acetate material until it is distilled, and in subjecting the substantially dry causticized material to distillation to recover acetone and additional allied volatile material.

16. The process of treating the waste liquor produced in the manufacture of wood pulp by the soda pulp process, which consists in concentrating the waste liquor, in reducing the concentrated material to a causticized ligneous acetate material by incorporating quicklime therewith, in minimizing undesirable oxidizing action on said causticized ligneous acetate material until it is distilled, and in subjecting the causticized material to distillation to recover acetone and additional allied volatile material.

17. The process of treating the waste liquor produced in the manufacture of wood pulp by the soda pulp process, which consists in concentrating the waste liquor, in incorporating powdered quicklime therewith to transform the resulting mixture into substantially dry condition and produce causticized ligneous acetate material, and in subjecting the substantially dry causticized material to distillation to recover acetone and additional allied volatile material.

VIGGO DREWSEN.